United States Patent
Goodall

(10) Patent No.: US 9,608,880 B1
(45) Date of Patent: Mar. 28, 2017

(54) SYSTEMS AND METHODS FOR REAL-TIME PERFORMANCE MONITORING

(71) Applicant: Dell Products L.P., Round Rock, TX (US)

(72) Inventor: Alan Goodall, North Berwick (GB)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 14/626,089

(22) Filed: Feb. 19, 2015

(51) Int. Cl.
*G06F 15/173* (2006.01)
*H04L 12/26* (2006.01)
*H04N 1/41* (2006.01)

(52) U.S. Cl.
CPC ............. *H04L 43/045* (2013.01); *H04N 1/41* (2013.01)

(58) Field of Classification Search
CPC ................................ H04L 43/045; H04N 1/41
See application file for complete search history.

(56) References Cited

U.S. PATENT DOCUMENTS

| | | | |
|---|---|---|---|
| 7,509,343 B1 | 3/2009 | Washburn et al. | |
| 7,979,245 B1 | 7/2011 | Bourlatchkov et al. | |
| 8,175,863 B1 | 5/2012 | Ostermeyer et al. | |
| 9,251,035 B1 * | 2/2016 | Vazac | G06F 11/3495 |
| 2013/0159512 A1 | 6/2013 | Groves et al. | |
| 2014/0033055 A1 * | 1/2014 | Gardner | H04L 41/22 |
| | | | 715/736 |
| 2015/0113422 A1 * | 4/2015 | Pfeiffer | G06F 19/327 |
| | | | 715/739 |
| 2015/0271032 A1 * | 9/2015 | Gingade | G06F 3/04847 |
| | | | 715/736 |
| 2015/0295778 A1 * | 10/2015 | Hsiao | H04L 41/22 |
| | | | 715/736 |
| 2016/0026552 A1 * | 1/2016 | Holden | G06F 8/65 |
| | | | 709/224 |

OTHER PUBLICATIONS

Beresniewicz, John; "Proactive Performance Monitoring with Baselines and Adaptive Thresholds"; Oracle Open World 2008; 37 pages.

* cited by examiner

*Primary Examiner* — Krisna Lim
(74) *Attorney, Agent, or Firm* — Winstead PC

(57) ABSTRACT

In one embodiment, a method includes causing a real-time performance dashboard to be displayed, wherein the real-time performance dashboard comprises a time-indexed line that represents a status of at least one monitored system over time, wherein the status is determined, at least in part, as a composite of a plurality of time-series performance metrics. The method further includes receiving, for a time interval, new values of at least a portion of the time-series performance metrics. The method additionally includes, responsive to a determination that at least one performance event has occurred during the time interval, causing a portion of the time-indexed line which corresponds to the time interval to graphically indicate instability. Further, the method includes, responsive to a determination that no performance event has occurred during the time interval, causing the portion of the time-indexed line which corresponds to the time interval to graphically indicate stability.

20 Claims, 4 Drawing Sheets

SYSTEMS AND METHODS FOR REAL-TIME PERFORMANCE MONITORING

BACKGROUND

Technical Field

The present disclosure relates generally to performance monitoring and more particularly, but not by way of limitation, to systems and methods for real-time performance monitoring.

History of Related Art

In information technology (IT) management, performance data may be collected from numerous sources. Presenting relevant information to appropriate individuals in a timely fashion is increasingly difficult due to the number of sources and amount of data, among other factors.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes causing a real-time performance dashboard to be displayed, wherein the real-time performance dashboard comprises a time-indexed line that represents a status of at least one monitored system over time, wherein the status is determined, at least in part, as a composite of a plurality of time-series performance metrics. The method further includes receiving, for a time interval, new values of at least a portion of the time-series performance metrics. The method also includes determining based, at least in part, on the new values, whether a performance event has occurred during the time interval. The method additionally includes, responsive to a determination that at least one performance event has occurred during the time interval, causing a portion of the time-indexed line which corresponds to the time interval to graphically indicate instability. Further, the method includes, responsive to a determination that no performance event has occurred during the time interval, causing the portion of the time-indexed line which corresponds to the time interval to graphically indicate stability.

In one embodiment, an information handling system includes at least one processor, wherein the at least one processor is operable to implement a method. The method includes causing a real-time performance dashboard to be displayed, wherein the real-time performance dashboard comprises a time-indexed line that represents a status of at least one monitored system over time, wherein the status is determined, at least in part, as a composite of a plurality of time-series performance metrics. The method further includes receiving, for a time interval, new values of at least a portion of the time-series performance metrics. The method also includes determining based, at least in part, on the new values, whether a performance event has occurred during the time interval. The method additionally includes, responsive to a determination that at least one performance event has occurred during the time interval, causing a portion of the time-indexed line which corresponds to the time interval to graphically indicate instability. Further, the method includes, responsive to a determination that no performance event has occurred during the time interval, causing the portion of the time-indexed line which corresponds to the time interval to graphically indicate stability.

In one embodiment, a computer-program product includes a non-transitory computer-usable medium having computer-readable program code embodied therein. The computer-readable program code is adapted to be executed to implement a method. The method includes causing a real-time performance dashboard to be displayed, wherein the real-time performance dashboard comprises a time-indexed line that represents a status of at least one monitored system over time, wherein the status is determined, at least in part, as a composite of a plurality of time-series performance metrics. The method further includes receiving, for a time interval, new values of at least a portion of the time-series performance metrics. The method also includes determining based, at least in part, on the new values, whether a performance event has occurred during the time interval. The method additionally includes, responsive to a determination that at least one performance event has occurred during the time interval, causing a portion of the time-indexed line which corresponds to the time interval to graphically indicate instability. Further, the method includes, responsive to a determination that no performance event has occurred during the time interval, causing the portion of the time-indexed line which corresponds to the time interval to graphically indicate stability.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
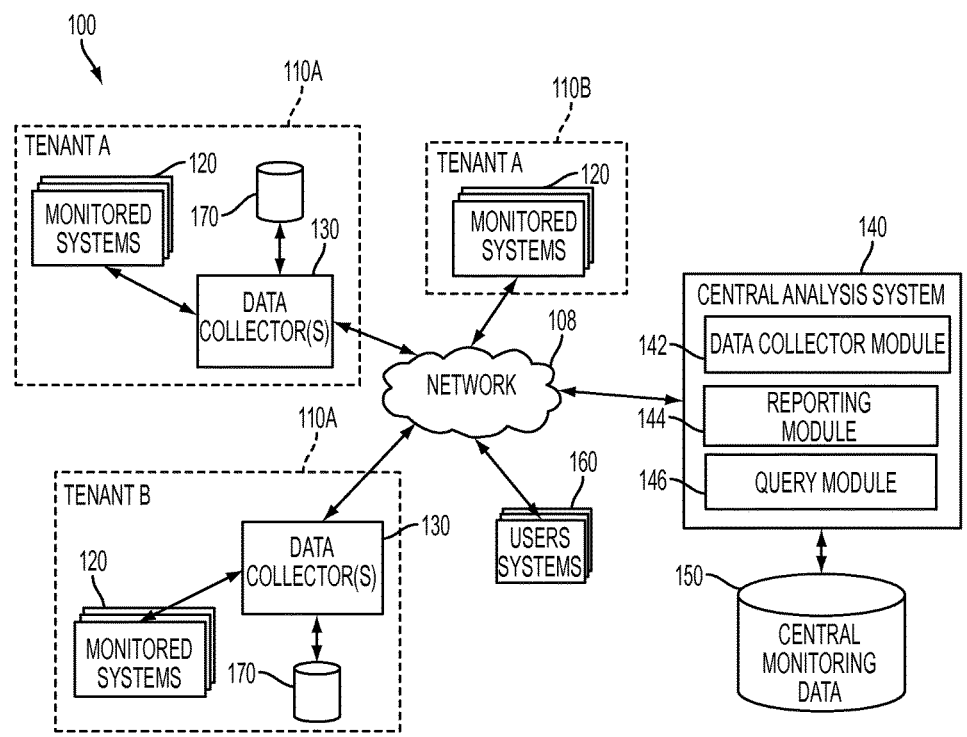
FIG. 1 illustrates an example computing environment.

In some embodiments, numerous monitored systems may be monitored for satisfactory performance. For example, for a given enterprise, there may be many thousands of databases that each have many thousands of database instances. Using various data collectors, numerous metrics on the health of each database, and each database instance, may be obtained. In addition, every time a metric threshold is exceeded, an incident or alert can be created.

According to the above example, as a result of the number of databases (and instances thereof) that are managed and the corresponding volume of metrics that are tracked, troubleshooting and root-cause analysis can be grossly inefficient. It can be very hard to spot real issues when they occur. In an example, if there are 1,400 database instances, each monitored by at least ten metrics, some captured every 2 minutes, in a single hour there could be over 100,000 metric values. If any do result in alerts, it can be difficult to identify, for example, which alerts are critical or correspond to one or more root causes.

The present disclosure describes examples of a real-time performance dashboard that graphically depicts monitored systems as time-indexed lines. In some cases, a single, time-indexed line can indicate an overall status over time for an aggregation of numerous monitored systems. For a given time interval, or for a given point in time, a status can be determined as a composite of numerous time-series metrics related to the performance of the monitored systems.

In an example, if an adverse performance event is determined for a particular time interval (e.g., a performance metric value fails to satisfy a threshold), a corresponding time-indexed line can graphically indicate instability, for example, via waves or oscillations on a portion thereof which corresponds to the particular time interval. According to this example, if no adverse performance event is determined for the particular time interval, the corresponding time-indexed line can graphically indicate stability, for example, by being flat over a portion thereof corresponding to the particular time interval. Advantageously, in certain embodiments, graphical indications of instability on time-indexed lines can more quickly and efficiently alert administrators and other users of problems in groups of monitored systems. Thereafter, the administrators or other users can drill down into monitoring data for a known problem area.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example computing environment 100 for implementing a central analysis system 140. In the computing environment 100, tenant systems 110 connect to the central analysis system 140 over a network 108, which may be a private network, a public network, a local or wide area network, the Internet, combinations of the same, or the like. Each of the tenant systems 110 can represent an installation of physical and/or virtual computing infrastructure. In general, the tenant systems 110 can provide various types of monitoring data to the central analysis system 140, including, for example, performance data (e.g., performance metrics) and system configuration data.

The tenant systems 110 shown can be owned or operated by the same or different entities. For example, two of the tenant systems 110 installed in separate locations are shown as owned or operated by "Tenant A," while another system 110 is owned or operated by a different tenant, "Tenant B." Tenants A and B can represent customers (e.g., entities such as companies or individuals) of an operator of the central analysis system 140. Collectively, tenant systems 110 monitored by the central analysis system 140 can be part of a federation. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more monitored systems 120. The monitored systems 120 can include physical and/or virtual computing devices, such as physical machines and/or virtual machines. For instance, a monitored system 110 may include any of the following: an information handling system, a virtual machine, server, web server, application server, database, application, processor, memory, hard drive or other storage device, peripheral, software component, database tables, tablespaces in a database, application tiers, network switches or other network hardware, combinations of the same or the like. Any given tenant system 110 can include from one to several monitored systems 120. For example, a tenant system 110 can represent an entire data center having hundreds or even thousands of monitored systems 120.

Data collectors 130 and local data stores 170 can be provided in some or all of the tenant systems 110. In the depicted embodiment, data collectors 130 and local data stores 170 are shown in a pair of the tenant systems 110A. No data collector 130 or local data store 170 is provided in one of the tenant systems 110B, which tenant can be an example of a data collection module 142 of the central analysis system 140 in some cases directly collecting monitoring data from the monitored systems 120. In some embodiments, the tenant systems 110 can additionally maintain a cache (not explicitly shown) for storing metrics derived from data elements in the local data store 170. In these embodiments, the tenant systems 110, or the data collectors 130, could be configured to periodically compute the derived metrics and store in the cache.

The data collectors 130 can be software and/or hardware agents, appliances, or the like that collect monitoring data about the monitored systems 120. This monitoring data can include time-series data related to the performance of physical and/or software components (including virtual components), such as performance related to any of the monitored systems 120 described above. The monitoring data can also include information about attributes, characteristics, or properties of the monitored systems 120, such as the number of processors in each host device, memory or storage capacity, hardware or software specifications, virtual machine characteristics, and so forth. The data collectors 130 can collect this monitoring data in real-time, periodically, e.g., according to a schedule, on-demand, or a combination of the same, and store the monitoring data in the local data stores 170. In some tenant system 110 installations having many monitored systems 120, one or more management servers (not shown) can manage data collection of a plurality of data collectors 130.

As mentioned above, the data collectors 130 can store the collected monitoring data in the local data stores 170. In addition, the data collectors 130 can provide the collected monitoring data to the central analysis system 140 upon request, or, in some cases, as a live stream. Other tenant systems 110 that do not have local data collectors 130, such as the tenant system 110B, can provide monitoring data directly to the central analysis system 140. The central analysis system 140, or more specifically the data collection module 142, can access this data remotely by querying libraries or APIs of the tenant systems 110B, thereby replacing the functionality of the data collectors 130 in some embodiments. More generally, in other embodiments, local data collectors 130 or other agents may be omitted, or each tenant system 110 can include one or more data collectors 130.

For smaller computing environments, the central analysis system 140 can be implemented as a single management server. Alternatively, the central analysis system 140 can be implemented in a plurality of virtual or physical servers, which may or may not be geographically co-located. For example, the central analysis system 140 and/or other aspects of the computing environment 100 may be hosted in a cloud-based hosting service such as the Azure™ service provided by Microsoft® or the EC2™ platform provided by Amazon®.

Example implementations for collecting data using agents and management servers is described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent") and U.S. application Ser. No. 12/370,399 ("the '399 application"). The central analysis system 140 and data collectors 130 can implement some or all of the features described in the '245 patent and the '399 application.

In the depicted embodiment, the central analysis system 140 includes the data collection module 142, a reporting module 144, and a query module 146. Each of these components can be implemented with hardware and/or software, including (optionally) virtual machines. In an example, the central analysis system 140 can be implemented as a single management server. In another example, the central analysis system 140 can be implemented in a plurality of virtual or physical servers, which may or may not be geographically co-located. For instance, the central analysis system 140 and/or other aspects of the computing environment 100 may be hosted in a cloud-based hosting service such as the Azure™ service provided by Microsoft® or the EC2™ platform provided by Amazon®.

As described above, the data collection module 142 can, in some cases, collect monitoring data directly from the monitored systems 120 (e.g., using web service calls or other remote procedure calls) for storage in the central data store 150. The reporting module 144 can generate regular or on-demand reports related to the monitoring data. In various cases, these reports can provide a snapshot of some or all of the monitored systems 120. The reporting module 144 typically accesses the monitoring data via the query module 146. The reporting module 144 can publish reports or other generated information, for example, to a web page, dashboard, and/or the like. In particular, the reporting module 144 can cause real-time performance dashboards comprising time-indexed lines to be displayed. The reporting module 144 can also update such displays responsive to new monitoring data. Examples will be described with respect to FIGS. 3-4.

The query module 146 can generate and execute a query of the central data store 150. In some embodiments, the query module 146 can access values of data elements that, in various cases, may be stored on the central data store 150. The web page, user dashboard or other user interface(s) output, for example, by the reporting module 144, can be accessed by users of user systems 160. The query module 146 can also provide a user interface, for instance, that allows the users of the user systems 160 to obtain customized data related to any data maintained by the central data store 150. The user systems 160 can include any type of computing device, including information handling systems such as desktops, laptops, tablets, smartphones, PDAs, to name a few. The user systems 160 can be operated by users associated with the tenants or by other users.

Figure 2:
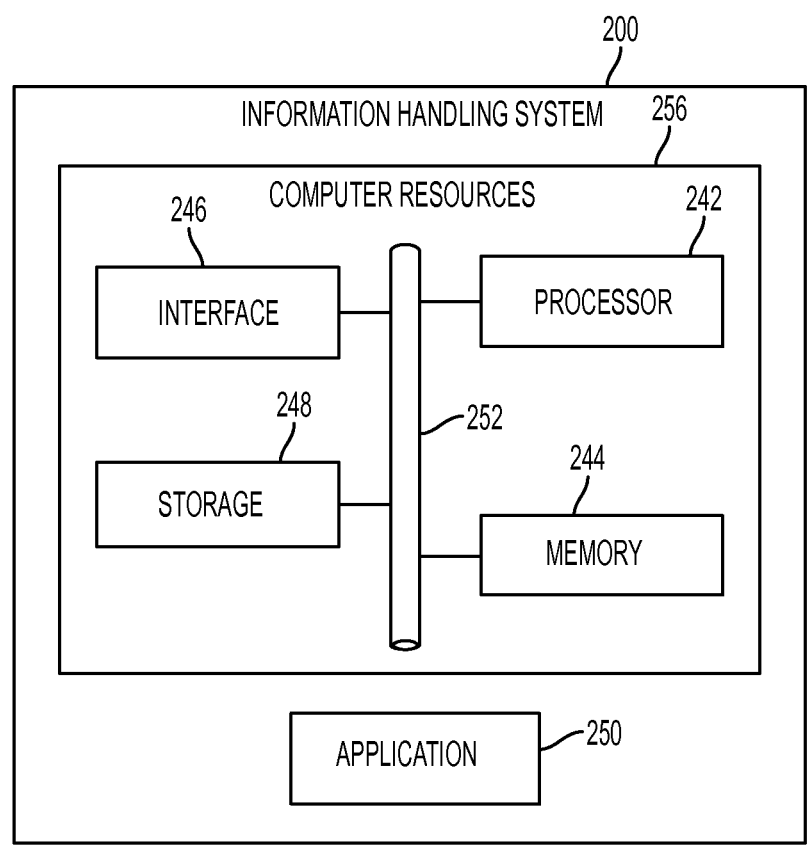
FIG. 2 illustrates an example of an information handling system.

FIG. 2 illustrates an example of an information handling system 200 that, in some cases, can be representative, for example, of the tenant systems 110, the monitored systems 120, the data collectors 130, the user systems 160 and/or the central analysis system 140 of FIG. 1. The information handling system 200 includes an application 250 operable to execute on computer resources 256. The application 250 can be similar, for example, to the data collection module 142, the reporting module 144, the query module 146 and, in some cases, the data collectors 130. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
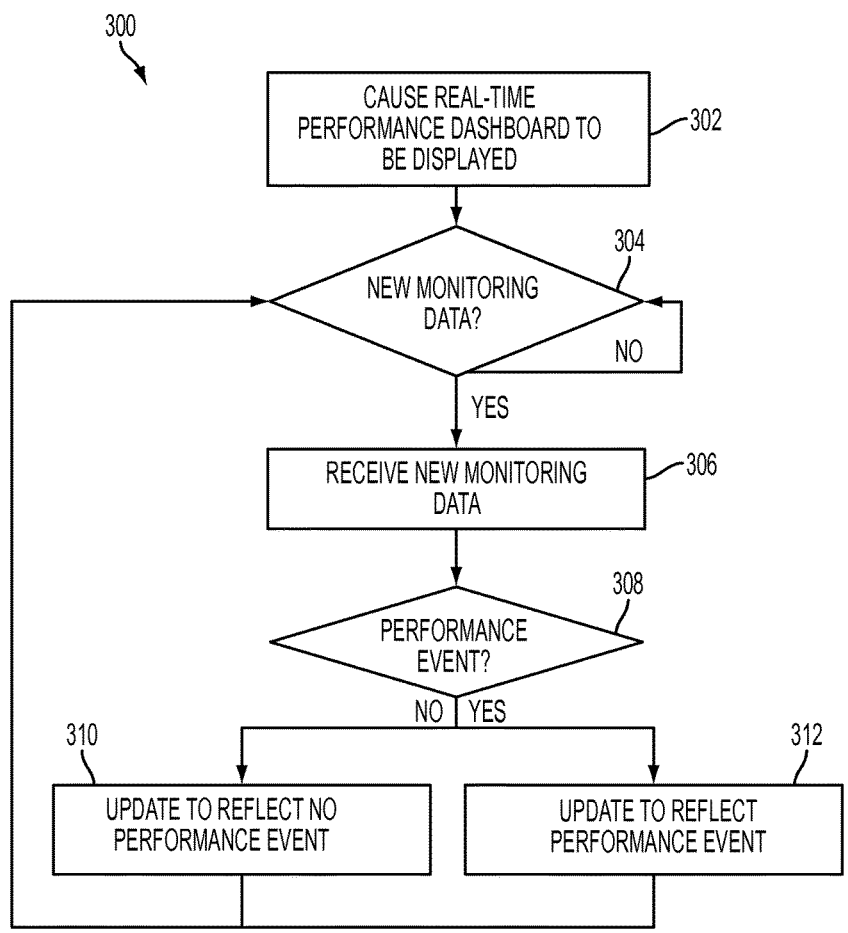
FIG. 3 illustrates an example of a process for displaying and updating real-time performance dashboards.

FIG. 3 illustrates an example of a process 300 for displaying and updating real-time performance dashboards. For example, the process 300, in whole or in part, can be implemented by one or more of the central analysis system 140, the data collection module 142, the reporting module 144, and/or the query module 146. The process 300 can also be performed generally by the computing environment 100. Although any number of systems, in whole or in part, can implement the process 300, to simplify discussion, the process 300 will be described in relation to specific systems or subsystems of the computing environment 100.

At block 302, the reporting module 144 causes a real-time performance dashboard to be displayed. In general, the real-time performance dashboard can include a plurality of time-indexed lines that can each represent an overall status over time of one or more monitored systems. Each time-indexed line can, in effect, consolidate certain sets of monitoring data collected in the computing environment 100.

In an example, a particular database may have sixteen instances thereof in existence at a given time. As a result of the sixteen instances, hundreds of performance metric values may be collected every hour. According to this example, a single, time-indexed line can compositely represent an overall status over time, or health, of the sixteen instances. Continuing this example, instances of other databases can be consolidated into a single, time-indexed line in similar fashion. In that way, the real-time performance dashboard can provide a snapshot of the health of numerous databases, regardless of how many database instances may be in existence at a given time. A more detailed example of the real-time performance dashboard will be described in relation to FIG. 4.

For simplicity of description, the remainder of the process 300 will be described in relation to a particular time-indexed line of the real-time performance dashboard. It should be appreciated that similar functionality can be performed for each of the time-indexed lines of the real-time performance dashboard.

At decision block 304, the reporting module 144 determines whether there is new monitoring data related to any of the monitored systems reflected in the particular time-indexed line. If not, the reporting module 144 remains at block 304 until there is new monitoring data related to the particular time-indexed line. Otherwise, if it is determined at decision block 304 that there is new monitoring data, the process 300 proceeds to block 306.

At block 306, the new monitoring data is received. The new monitoring data can include, for example, new values of one or more of the performance metrics on which the particular time-indexed line is based. In general, the new monitoring data can relate to a particular point in time, a particular time interval, etc. Various portions of the new monitoring data can relate to different points in time and/or different time intervals.

At decision block 308, the reporting module 144 determines, based on the new monitoring data, whether a performance event has occurred. A performance event can be, for example, the fact that a performance metric satisfies a threshold, the fact that a performance metric does not satisfy a threshold, combinations of same, and/or the like. It should be appreciated that what constitutes a performance event can be configurable, adaptable based on what is "normal" for a system component given historical data, etc. In some embodiments, a threshold associated with a performance event can be an adaptive threshold that changes, for example, in accordance with a time of day, time of year, etc. In these embodiments, the adaptive threshold may be based, for example, on historical data related to load, number of requests, etc.

If, at the decision block 308, it is determined that no performance event has occurred, the process 300 proceeds to block 310. At block 310, the reporting module 144 updates the real-time performance dashboard to reflect that no performance event has occurred. For example, the reporting module 144 can cause a portion of the particular time-indexed line which corresponds to the time interval, or point in time, of the performance event to graphically indicate stability. The graphical indication of stability can be any suitable indicator of satisfactory performance such as, for example, a flat line.

If it is determined at the decision block 308 that at least one performance event has occurred, the process 300 proceeds to block 312. At block 312, the reporting module 144 updates the real-time performance dashboard to reflect that a performance event has occurred. For example, the reporting module 144 can cause a portion of the particular time-indexed line which corresponds to the time interval, or point in time, of the performance event to graphically indicate instability.

The graphical indication of instability can be any suitable indicator of unsatisfactory performance such as, for example, waves, oscillations, vibrations, etc. In some embodiments, the graphical indication of instability can be varied based a number of performance events, a performance-event severity (e.g., a metric that greatly exceeds a threshold), a performance-event type (e.g., a particular performance metric, deemed especially indicative of a problem, fails to satisfy a threshold), and/or frequency of performance events (e.g., three or more performance events in ten minutes).

For example, in embodiments in which the graphical indication of instability includes oscillation, a degree of oscillation and number of oscillations can be configurable. The degree of oscillation can be defined, for example, in terms of how far above or below a point of reference to oscillate. The point of reference can be, for example, a location where a flat line would otherwise be drawn (e.g., a flat line that is indicative of no performance events). In an example, performance events deemed more severe or that have occurred frequently can be associated with a greater degree of oscillation, a higher number of oscillations, etc.

From either the block 310 or the block 312, the process 300 returns to the decision block 304 and proceeds as described above. In general, the process 300 can continue until terminated by a user or administrator or other stop criteria is satisfied.

Figure 4:
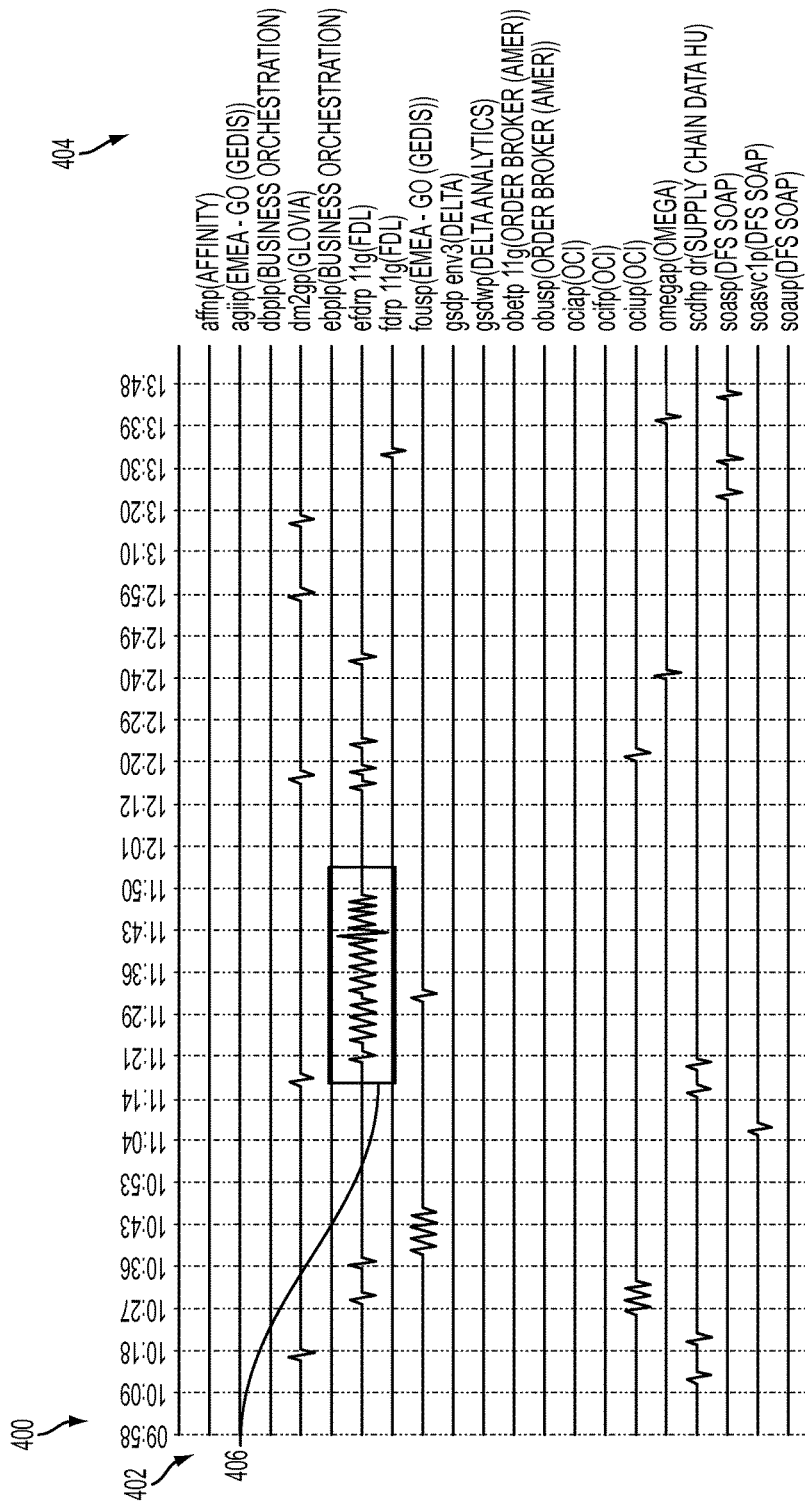
FIG. 4 illustrates an example of a real-time performance dashboard.

FIG. 4 illustrates an example of a real-time performance dashboard 400. In various embodiments, the real-time performance dashboard 400 can be caused to be displayed as described with respect to block 302 of FIG. 3. A plurality of time-indexed lines 402 are shown for a plurality of databases 404. In the illustrated embodiment, each of the databases 404 corresponds to a plurality of database instances. In that way, each of the databases 404 can have large quantities of monitoring data collected in an association therewith (e.g., performance metric values, collected at regular intervals, related to each database instance).

Oscillations in the time-indexed lines 402 can be indicative of performance events. For example, a set of oscillations 406 includes several oscillations, one of which has a greater degree of oscillation than the others. In an embodiment, the set of oscillations 406 can be indicative of a major performance event that merits immediate attention. In certain embodiments, a user can select any of the databases 404 and view drill-down information such as, for example, visualizations of database instances causing performance events for a selected database, other related monitoring data, etc.

Although certain examples have been described herein relative to databases, it should be appreciated that time-index lines can be used in a similar fashion visualize a status, or health, of other groups of monitored systems. In general, the time-index lines can consolidate any collection of the monitored systems described with respect to FIG. 1. For example, a given time-index line can consolidate monitored systems associated with a particular distributed software application (e.g., application server, database server, etc.). Other examples will be apparent to one skilled in the art after reviewing the present disclosure.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
causing a real-time performance dashboard to be displayed, wherein the real-time performance dashboard comprises a time-indexed line that represents a status of at least one monitored system over time, wherein the status is determined, at least in part, as a composite of a plurality of time-series performance metrics;
receiving, for a time interval, new values of at least a portion of the time-series performance metrics;
determining based, at least in part, on the new values, whether a performance event has occurred during the time interval;
responsive to a determination that at least one performance event has occurred during the time interval, causing a portion of the time-indexed line which corresponds to the time interval to graphically indicate instability; and
responsive to a determination that no performance event has occurred during the time interval, causing the portion of the time-indexed line which corresponds to the time interval to graphically indicate stability.

2. The method of claim 1, wherein the graphical indication of instability comprises line oscillation according to a predefined degree of oscillation associated with the at least one performance event.

3. The method of claim 2, wherein the predefined degree of oscillation is varied according to a determined severity of the at least one performance event.

4. The method of claim 1, wherein the graphical indication of instability comprises line vibration.

5. The method of claim 1, wherein the graphical indication of stability comprises a flat line.

6. The method of claim 1, wherein:
the at least one monitored system comprises a plurality of instances of a particular database; and
the time-series metrics comprise at least one metric related to each instance of the plurality of instances.

7. The method of claim 1, wherein:
the at least one monitored system comprises an aggregation of components that support a distributed software application; and
the time-series metrics comprise at least one metric related to each component of the aggregation.

8. The method of claim 1, comprising:
wherein the real-time performance dashboard comprises a plurality of time-indexed lines, each time-indexed line representing a status of one or more monitored systems over time, wherein the status is determined, at least in part, as a composite of a plurality of time-series performance metrics.

9. The method of claim 1, wherein the determining comprises evaluating the new values against performance thresholds associated with the at least a portion of the time-series metrics.

10. The method of claim 9, wherein at least one of the performance thresholds is an adaptive threshold.

11. An information handling system comprising:
at least one processor, wherein the at least one processor is operable to implement a method comprising:
causing a real-time performance dashboard to be displayed, wherein the real-time performance dashboard comprises a time-indexed line that represents a status of at least one monitored system over time, wherein the status is determined, at least in part, as a composite of a plurality of time-series performance metrics;
receiving, for a time interval, new values of at least a portion of the time-series performance metrics;
determining based, at least in part, on the new values, whether a performance event has occurred during the time interval;
responsive to a determination that at least one performance event has occurred during the time interval, causing a portion of the time-indexed line which corresponds to the time interval to graphically indicate instability; and
responsive to a determination that no performance event has occurred during the time interval, causing the portion of the time-indexed line which corresponds to the time interval to graphically indicate stability.

12. The information handling system of claim 11, wherein the graphical indication of instability comprises line oscillation according to a predefined degree of oscillation associated with the at least one performance event.

13. The information handling system of claim 12, wherein the predefined degree of oscillation is varied according to a determined severity of the at least one performance event.

14. The information handling system of claim 11, wherein the graphical indication of instability comprises line vibration.

15. The information handling system of claim 11, wherein the graphical indication of stability comprises a flat line.

16. The information handling system of claim 11, wherein:
the at least one monitored system comprises a plurality of instances of a particular database; and
the time-series metrics comprise at least one metric related to each instance of the plurality of instances.

17. The information handling system of claim 11, wherein:
the at least one monitored system comprises an aggregation of components that support a distributed software application; and
the time-series metrics comprise at least one metric related to each component of the aggregation.

18. The information handling system of claim 11, comprising:
wherein the real-time performance dashboard comprises a plurality of time-indexed lines, each time-indexed line representing a status of one or more monitored systems over time, wherein the status is determined, at least in part, as a composite of a plurality of time-series performance metrics.

19. The information handling system of claim 11, wherein the determining comprises evaluating the new values against performance thresholds associated with the at least a portion of the time-series metrics.

20. A computer-program product comprising a non-transitory computer-usable medium having computer-readable program code embodied therein, the computer-readable program code adapted to be executed to implement a method comprising:

causing a real-time performance dashboard to be displayed, wherein the real-time performance dashboard comprises a time-indexed line that represents a status of at least one monitored system over time, wherein the status is determined, at least in part, as a composite of a plurality of time-series performance metrics;

receiving, for a time interval, new values of at least a portion of the time-series performance metrics;

determining based, at least in part, on the new values, whether a performance event has occurred during the time interval;

responsive to a determination that at least one performance event has occurred during the time interval, causing a portion of the time-indexed line which corresponds to the time interval to graphically indicate instability; and responsive to a determination that no performance event has occurred during the time interval, causing the portion of the time-indexed line which corresponds to the time interval to graphically indicate stability.

* * * * *